(12) United States Patent
Brunner et al.

(10) Patent No.: US 11,370,375 B2
(45) Date of Patent: Jun. 28, 2022

(54) CLADDING PART AND METHOD FOR PRODUCING A CLADDING PART

(71) Applicant: Bayerische Motoren Werke Aktiengesellschaft, Munich (DE)

(72) Inventors: Johann Brunner, Neumarkt St. Veit (DE); Patrick Dumm, Furth (DE); Manuel Schwarz, Landshut (DE); Thomas Wolff, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 190 days.

(21) Appl. No.: 16/680,638

(22) Filed: Nov. 12, 2019

(65) Prior Publication Data

US 2020/0156577 A1 May 21, 2020

(30) Foreign Application Priority Data

Nov. 21, 2018 (DE) ...................... 10 2018 129 360.7

(51) Int. Cl.
*B60R 19/48* (2006.01)
*B60R 13/04* (2006.01)

(52) U.S. Cl.
CPC ............ *B60R 19/483* (2013.01); *B60R 13/04* (2013.01)

(58) Field of Classification Search
CPC . B60R 19/483; B60R 13/04; B60R 2011/004; B60R 2011/0096; B60R 2011/0098; B60R 9/02; B60R 9/06
USPC ................. 293/102, 120, 121; 296/191, 1.08
See application file for complete search history.

(56) References Cited

U.S. PATENT DOCUMENTS

| | | | | |
|---|---|---|---|---|
| 5,629,690 A | * | 5/1997 | Knoll .................... | G01S 15/931 340/904 |
| 7,518,491 B2 | * | 4/2009 | Oda ........................ | G01S 7/521 180/274 |
| 7,902,968 B2 | * | 3/2011 | Kojima ................ | G10K 11/004 340/435 |
| 8,942,066 B2 | * | 1/2015 | Prausse ................. | B60R 19/483 367/188 |
| 2005/0253693 A1 | * | 11/2005 | Rennick ................ | B60R 19/483 340/435 |
| 2007/0144261 A1 | | 6/2007 | Okuda et al. | |

(Continued)

FOREIGN PATENT DOCUMENTS

DE   10 2006 061 182 A1   7/2007
DE   10 2006 038 598 A1   5/2008

OTHER PUBLICATIONS

German-language Search Report issued in counterpart German Application No. 10 2018 129 360.7 dated Oct. 15, 2019 with English translation (12 pages).

*Primary Examiner* — Gregory A Blankenship
(74) *Attorney, Agent, or Firm* — Crowell & Moring LLP

(57) ABSTRACT

A cladding part for a motor vehicle has an external side, and an internal side which is disposed opposite the external side. At least one sensor is disposed on the internal side. The cladding part has at least one main region and at least one functional region, wherein the functional region in terms of oscillations has a lower damping value than the main region. The functional region at least in portions is surrounded by a decoupling region, wherein the cladding part in the decoupling region has a first mechanical rigidity value and in the main region has a second mechanical rigidity value. The first rigidity value is lower than the second rigidity value.

11 Claims, 1 Drawing Sheet

(56) References Cited

U.S. PATENT DOCUMENTS

2009/0015392 A1\* 1/2009 Takahashi ........... B60R 21/0136
340/436
2020/0156577 A1\* 5/2020 Brunner .................. B60R 13/04

\* cited by examiner

CLADDING PART AND METHOD FOR PRODUCING A CLADDING PART

CROSS REFERENCE TO RELATED APPLICATION

This application claims priority under 35 U.S.C. § 119 from German Patent Application No. 10 2018 129 360.7, filed Nov. 21, 2018, the entire disclosure of which is herein expressly incorporated by reference.

BACKGROUND AND SUMMARY OF THE INVENTION

The invention relates to a cladding part and to a method for producing a cladding part.

In the modern construction of vehicles it has become commonplace for distance sensors to be offered in order to increase the ease of driving when parking a vehicle, said distance sensors facilitating the driver in determining the distance from neighboring surrounding objects such as, for example, parked vehicles, etc. These parking distance control sensors (PDC sensors) in the prior art are installed in the region of the bumper cladding and are visible to an observer standing outside the vehicle. The bumper cladding herein has to be punched, or a hole for the sensor has to be incorporated in another manner. When ultrasound-based PDC sensors are used, the ultrasonic diaphragm is a component part of the sensor and is separated from the bumper cladding, or insulated in terms of oscillations, respectively, by a decoupling ring. The sensor is held in position by a holder which is fastened to the internal side of the bumper cladding.

However, the openings for the PDC sensors in the bumper cladding require keeping different variants of bumper cladding in stock, specifically claddings with and claddings without clearances for PDC sensors. In terms of production and logistics, this is associated with an additional complexity, in particular additional costs. Moreover, customers of expensive vehicles expect the PDC sensors be supplied painted in the color of the car, which likewise leads to an increase in terms of the production complexity. Last but not least, the visual appearance of the vehicle exterior is increasingly indented by an increasing number of sensors and is perceived as being unattractive by customers.

Proceeding from this prior art, the present invention is based on the object of providing an improved cladding component which is distinguished by a high surface quality. It is moreover an object of the invention to provide a method for producing such a cladding component in which the production complexity is reduced.

This and other objects are achieved by a vehicle component and by a method in accordance with the claimed invention.

The present invention provides a cladding part, in particular an external cladding part for motor vehicles, having an external side and an internal side which is disposed opposite the external side, wherein at least one sensor is disposed on the internal side of the cladding part. The cladding part can have at least one main region and at least one functional region, wherein the functional region in terms of oscillations, in particular ultrasonic oscillations, has a lower damping value than the main region. Such oscillations are omitted or received by the sensor. Furthermore, the functional region at least in portions can be surrounded by a decoupling region. The cladding part herein in the decoupling region can have a first mechanical rigidity value and in the main region have a second rigidity value, wherein the first rigidity value and the second rigidity value are mutually dissimilar.

According to a first variant of the invention, the first rigidity value is lower than the second rigidity value. On account of the rigidity value in the decoupling region being reduced, the functional region can transmit oscillations which are emitted by the sensor better than the main region. In other words, oscillations that are emitted by the sensor are damped to a lesser extent in the functional region, or in the sensor region, respectively, than in the main region such that the functional region is configured as an oscillation-transmitting or oscillation-active face of the cladding part. According to a second variant, the first rigidity value can also be higher than the second rigidity value.

The decoupling region can be configured such that the decoupling region is disposed about the functional region. The decoupling region herein substantially follows the contour of the functional region and partially or completely surrounds the functional region. The contour of the functional region herein can preferably be configured so as to be circular, triangular or polygonal, preferably square. Of course, any combinations of the afore-mentioned geometries are also contemplated. This offers the advantage that complete decoupling of the functional region is implemented such that an ideally high deflection of the amplitude can be implemented when the sensor that lies behind the functional region induces oscillations into the functional region, also referred to as the sensor region. The contour of the functional region preferably corresponds substantially to the function of the sensor.

The wall thickness of the cladding part can be of substantially identical size in a transition region from the decoupling region to the functional region. Additionally or alternatively, the wall thickness of the cladding part can be of substantially identical size in a transition region from the decoupling region to the main region. On account thereof, the cladding part has an almost uniform wall thickness in the region in which the sensor is disposed. Consequently, the dissimilar damping properties of the functional region and of the main region are not implemented by geometric variations such as, for example, jumps in the thickness of the wall of the cladding part, rather exclusively by way of dissimilar mechanical properties, for example rigidity values of the material of the cladding part.

Additionally or alternatively, the wall thickness in the functional region can be thinner than the thickness of the remaining cladding part. When the wall thicknesses of the decoupling region and of the main region are of identical size, the wall thickness of the functional region can thus be thinner than the wall thickness of the decoupling region and the wall thickness of the main region. Furthermore, an incremental wall thickness can also be provided, wherein the main region has the largest wall thickness, the functional region has the smallest wall thickness, and the decoupling region has a wall thickness in the range between the two wall thicknesses of the main region and of the decoupling region.

Furthermore, the cladding part can be configured from a crosslinkable plastics material, in particular from a polypropylene. Such plastics materials offer the advantage that the mechanical properties can be varied in a particularly simple manner in the production of the plastics material.

Apart from polypropylene, further thermoplastics are in principle also crosslinkable by irradiation. Except for polypropylene, in the case of all other thermoplastics that are crosslinkable by irradiation there is however no reduction but an increase in the mechanical properties. This could be exploited by a reversed application of the inventive teaching, wherein in this instance the regions of the cladding part in which the degree of crosslinking is increased are irradiated. Regions of the cladding part in which the mechanical properties are not varied or not increased, respectively, are accordingly not irradiated. According to this variant, the main region would be irradiated and the functional region would remain so as to be non-irradiated. The following alternative materials would be possible for carrying out this method: polyethylene (PE), polyamide (PA), polybutylene terephthalate (PBT), polyvinylidene fluoride (PVDF), ethylene tetrafluoroethylene (ETFE), polyvinyl chloride (PVC), ethylene vinyl acetate (EVA), and/or chlorinated polyethylene (PE-C).

The cladding part in the decoupling region can have a first degree of crosslinking and in the main region have a second degree of crosslinking, wherein the first degree of crosslinking and the second degree of crosslinking are dissimilar. According to a first variant of the invention, the first degree of crosslinking is lower than the second degree of crosslinking. On account of the degree of crosslinking being reduced in the decoupling region, Young's modulus is reduced such that the functional region when being excited by an oscillation has lower damping properties than the main region that is disposed about the peripheral region. According to a further variant, the first degree of crosslinking can also be higher than the second degree of crosslinking.

According to one embodiment, the cladding part in the functional region has the same degree of crosslinking and/or the same rigidity value as in the main region. On account thereof, the functional region can advantageously be configured as a diaphragm which transmits the oscillations which are generated by the sensor, or are detected by the sensor, respectively.

According to one embodiment, the cladding part in the functional region has the same degree of crosslinking and/or the same rigidity value as in the decoupling region. This offers the advantage of a particularly reduced damping property in the functional region, on account of which the functional region when excited by oscillations can reach particularly high amplitudes.

According to a third embodiment, the cladding part in the functional region has a lower degree of crosslinking and/or a lower rigidity value than in the decoupling region.

In one further aspect, the invention relates to a method for producing a cladding part according to the afore-described type. The production method herein comprises at least one step in which a crosslinkable initial material is crosslinked within a cavity which predefines the external design of the cladding part to be achieved. The crosslinkable material during the crosslinking is crosslinked to a dissimilar extent in the dissimilar portions which configure in each case the main region and in the portion which configures the decoupling region.

Furthermore, at least the region that configures the decoupling region can be irradiated during the crosslinking of the crosslinkable initial material.

In an alternative variant of the method, the reduction in terms of crosslinking, or the weakening of the substrate, respectively, which configures the cladding component, can take place in a separate, downstream, process step.

The irradiation in both variants of the method offers the advantage that very discrete regions which can be particularly well delimited in relation to the functional region and to the main regions can be configured with lower crosslinking. Additionally, the irradiation has not generated any surface marks on the surface of the cladding part such as would result, for example, in the case of alternative embodiments having variable wall thicknesses, or jumps in the wall thicknesses, respectively, in the cladding part.

Last but not least, the irradiation by way of electromagnetic radiation or electron radiation offers the advantage of a very efficient production method, wherein the production complexity and thus also the production costs are significantly reduced.

The advantages of the present invention are to be summarized once again hereunder. The advantages which are mentioned in the context of the cladding part can be applied in analogous manner to the method, and vice versa. The PDC sensors are installed so as to be obscured behind the bumper cladding. To this end, the bumper cladding has to assume the function of the ultrasonic diaphragm. However, since the bumper cladding in its entirety acts in a heavily damping manner, the functional region has to be decoupled. This is achieved by partially adapting the rigidity of the bumper cladding, wherein this takes place exclusively by a local variation of the mechanical rigidity values and not by variation of the wall thickness. In the case of plastics material being used as the material for the bumper cladding, the degree of crosslinking of the polymers is locally lowered by electron irradiation or electromagnetic radiation. The result herein is a reduction of Young's modulus, wherein a circular round or oval ring is weakened, for example, and thus is reduced in terms of Young's modulus.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
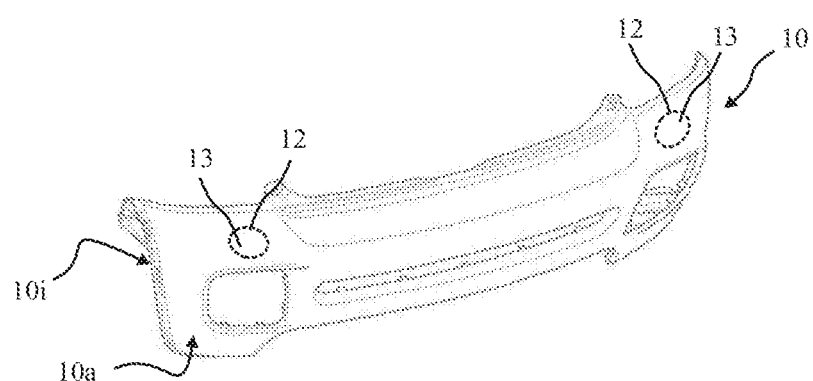
FIG. 1 is a perspective view of a cladding part for a vehicle.

A cladding part 10 for motor vehicles is depicted in an exemplary manner in FIG. 1. This herein is a bumper cladding 10 which will be disposed in the rear region of a vehicle. Deviating from the bumper cladding 10 for the rear, illustrated in FIG. 1, front bumper claddings, front and/or rear bumpers, trim strips which are attached to the doors or in the lateral region of the vehicle, or trim strips on the bumpers, can also function as cladding parts 10 in the context of this invention. Ultrasonic sensors 20 used for measuring the distance of objects from the motor vehicle are used in modern vehicle construction. In order for the distance to be measured, the sensor 20 with the aid of a diaphragm emits ultrasonic oscillations. Said ultrasonic oscillations are reflected on the object and received by the same sensor 20 or by another, separate, sensor. The distance of the object from the vehicle is determined from the travel-time of the ultrasonic signal which has been reflected. The cladding part 10 has an external surface 10a which, in the installed state, can be seen by an observer outside the vehicle. An internal surface 10i which, in the installed state of the cladding part 10, is invisible to passers-by or observers of the vehicle is provided on an opposite side of the cladding part 10.

One left-side and one right-side functional region 13 is in each case depicted on the external surface 10a. Said functional region 13 is circular and is enclosed by a decoupling region 12. In a further variant (not illustrated), a plurality of functional regions having the same or another shape can also be illustrated. The dashed line which for visually identifying the position of the decoupling region 12 is illustrated in FIG. 1 is not visible in reality but is provided only for improving the illustration of FIG. 1. In reality, the surface 10a is configured so as to be continuous in the region in which the function region 13 and the decoupling region 12 are provided.

Figure 2:
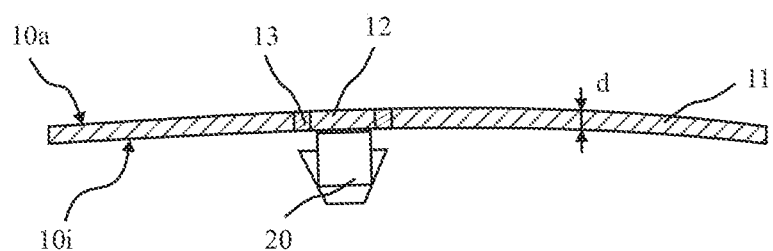
FIG. 2 is a sectional view through a cladding part of a vehicle component, according to a first embodiment.

FIG. 2 shows a sectional illustration of the component 10 from FIG. 1, wherein the section runs through the functional region 13, the main region 11, and the decoupling region 12. As can be seen from FIG. 2, an ultrasonic sensor 20 is disposed on an internal surface 10i of the cladding part 10. The cladding part 10 has a main region 11 and a functional region 13 which is delimited from the main region 11 by decoupling region 12. The cladding part 10, that is to say the bumper cladding, is a planar component having a comparatively minor component thickness d which is in the range from 0.5 mm to approx. 10 mm. The cladding part has a constant thickness d in the region in which the sensor 20 is disposed. The main region 11, the functional region 13, and the decoupling region 12 have the the same components thickness d. In a further embodiment (not illustrated in the figures), the individual regions 11, 12 or 13 can in each case have dissimilar component thicknesses. Furthermore, embodiments in which only two of the three regions have the same component thickness and the third region has a component thickness deviating therefrom can also exist.

The sensor 20 is an ultrasonic sensor, for example a piezo-electric element. The diaphragm of said piezo-electric element is disposed so as to be in physical contact with the functional region 13, for example adhesively bonded thereto. When the diaphragm of the sensor 20 is excited so as to oscillate, the diaphragm induces said oscillations into the functional region 13. On account of the decoupling with the aid of the decoupling region 12, said oscillations are transmitted to the main region 11 in a heavily damped manner. In other words, the functional region 13 when excited by a mechanical oscillation is deflected to a greater extent than the main region 11. In analogous but converse functional mode, the excitation of the sensor 20 takes place by mechanical oscillations which are reflected externally and which excite the functional region 13 so as to oscillate.

The method for producing a cladding component is to be explained in more detail hereunder. To this end, a crosslinking plastics material is injected into a cavity which is configured between two tool halves. Alternatively, a crosslinking initial material can also be incorporated in a mold which is closed thereafter. The initial material is crosslinked by impingement with pressure and/or temperature or by adding chemical reactors, and configures a dimensionally stable plastics material component. A multiplicity of macromolecules are connected to one another when crosslinking, said macromolecules then generating a three-dimensional network. The properties of the initial material are modified herein, wherein the hardness, the toughness, and the melting point are generally increased herein. At the same time, the solubility of the initial material is reduced. The higher the degree of crosslinking, the more the aforedescribed effects become apparent. For example, the greater the crosslinking, the greater the mechanical rigidity of the material. The crosslinking reaction can be influenced in a targeted manner by way of the targeted irradiation of individual regions when crosslinking the initial material. This has the result that the degree of crosslinking is reduced in the irradiated regions such that a lower component rigidity or component hardness, respectively, arises. These regions are particularly suitable for configuring the functional region 13 described in FIGS. 1 and 2 and/or the decoupling region 12. The material properties of polypropylene are reduced on account of the irradiation thereof since the material absorbs the radiation heat. This effect arises already at a low irradiation dose. The beams split the molecule chains of the substrate from polypropylene and reduce the molecular weight. This is associated with a reduction in the mechanical strength and the impact resistance.

The crosslinking can also be reduced by subsequent irradiation. The radiation energy is absorbed by the material when cross linking. The chemical bonds of the material are split and free radicals are created. In a subsequent step, the free radicals form the molecular bond to be achieved. The network thus created guarantees the desired material properties in terms of material strength. This variation of the material properties takes place on the completely crosslinked cladding part. A local degree of crosslinking which differs from other component regions can be implemented by means of precise irradiation, or by a targeted shielding of component regions that are not to be irradiated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cladding part for a motor vehicle, comprising:
an external side; and
an internal side which is disposed opposite the external side, wherein
at least one sensor is disposed on the internal side,
the cladding part has at least one main region and at least one functional region,
the functional region in terms of oscillations has a lower damping value than the main region,
the functional region at least in portions is surrounded by a decoupling region,
the cladding part in the decoupling region has a first mechanical rigidity value and in the main region has a second mechanical rigidity value, the first rigidity value and the second rigidity value being dissimilar, and
the cladding part in the decoupling region has a first degree of crosslinking and in the main region has a second degree of crosslinking, the first degree of crosslinking and the second degree of crosslinking being dissimilar.

2. The cladding part according to claim 1, wherein the cladding part is an external cladding for the motor vehicle.

3. The cladding part according to claim 1, wherein the at least one sensor is an ultrasonic sensor, and the oscillations are ultrasonic oscillations.

4. The cladding part according to claim 1, wherein the first rigidity value is lower than the second rigidity value.

5. The cladding part according to claim 1, wherein the decoupling region completely surrounds the functional region so as to follow a contour of the functional region.

6. The cladding part according to claim 1, wherein
a wall thickness of the cladding part is of substantially identical size in a transition region from the decoupling region to the functional region, and/or
the wall thickness of the cladding part is of substantially identical size in a transition region from the decoupling region to the main region.

7. The cladding part according to claim 1, wherein
the cladding part is configured from a crosslinkable plastics material.

8. The cladding part according to claim 7, wherein
the crosslinkable plastics material is polypropylene.

9. The cladding part according to claim 1, wherein
the first degree of crosslinking is lower than the second degree of crosslinking.

10. A cladding part for a motor vehicle, comprising:
an external side; and
an internal side which is disposed opposite the external side, wherein
at least one sensor is disposed on the internal side,
the cladding part has at least one main region and at least one functional region,
the functional region in terms of oscillations has a lower damping value than the main region,
the functional region at least in portions is surrounded by a decoupling region,
the cladding part in the decoupling region has a first mechanical rigidity value and in the main region has a second mechanical rigidity value, the first rigidity value and the second rigidity value being dissimilar, and
the cladding part in the functional region has the same degree of crosslinking and/or the same rigidity value as in the main region.

11. A cladding part for a motor vehicle, comprising:
an external side; and
an internal side which is disposed opposite the external side, wherein
at least one sensor is disposed on the internal side,
the cladding part has at least one main region and at least one functional region,
the functional region in terms of oscillations has a lower damping value than the main region,
the functional region at least in portions is surrounded by a decoupling region,
the cladding part in the decoupling region has a first mechanical rigidity value and in the main region has a second mechanical rigidity value, the first rigidity value and the second rigidity value being dissimilar, and
the cladding part in the functional region has the same degree of crosslinking and/or the same rigidity value as in the decoupling region.

* * * * *